(12) United States Patent
Liang et al.

(10) Patent No.: US 8,940,838 B2
(45) Date of Patent: Jan. 27, 2015

(54) POLYISOPRENE, PREPARATION METHOD THEREOF, POLYISOPRENE RUBBER COMPOUNDS AND VULCANIZATE THEREFROM

(71) Applicants: China Petroleum & Chemical Corporation, Beijing (CN); Beijing Research Institute of Chemical Industry, China Petroleum & Chemical Corporation, Beijing (CN)

(72) Inventors: Aimin Liang, Beijing (CN); Jie Zhang, Beijing (CN); Jiangwei Zhao, Beijing (CN); Chuanqing Li, Beijing (CN); Lin Xu, Beijing (CN); Ximing Xie, Beijing (CN); Guozhu Yu, Beijing (CN); Sufang Ouyang, Beijing (CN); Jinmei Tan, Beijing (CN); Liangliang Yang, Beijing (CN); Wei Sun, Beijing (CN); Yishuang Xin, Beijing (CN)

(73) Assignees: China Petroleum & Chemcial Corporation, Beijing (CN); Beijing Research Institute of Chemical Industry, China Petroleum & Chemical Corporation, Beijing (CN)

(*) Notice: Subject to any disclaimer, the term of this patent is extended or adjusted under 35 U.S.C. 154(b) by 0 days.

(21) Appl. No.: 13/903,573

(22) Filed: May 28, 2013

(65) Prior Publication Data

US 2013/0317176 A1 Nov. 28, 2013

(30) Foreign Application Priority Data

May 28, 2012 (CN) .......................... 2012 1 0168883

(51) Int. Cl.
*C08L 9/00* (2006.01)
*C08F 36/08* (2006.01)
*C08L 7/00* (2006.01)
*C08F 136/08* (2006.01)

(52) U.S. Cl.
CPC . *C08F 36/08* (2013.01); *C08L 7/00* (2013.01); *C08F 136/08* (2013.01); *C08L 9/00* (2013.01)

USPC .................. 525/236; 526/340.2; 526/119

(58) Field of Classification Search
CPC ........ C08F 36/08; C08F 136/08; C08F 4/545; C08L 9/00; C08L 2205/025; C08L 2314/06
USPC ................... 525/236; 526/119, 340.2
See application file for complete search history.

(56) References Cited

U.S. PATENT DOCUMENTS 3,925,514 A * 12/1975 Kohler et al. .................. 525/216
2004/0019171 A1 1/2004 Laubry

FOREIGN PATENT DOCUMENTS

| CN | 85102250 A | 1/1987 |
| CN | 1295087 A | 5/2001 |
| CN | 1342718 A | 4/2002 |
| CN | 1834121 A | 9/2006 |
| CN | 101045768 A | 10/2007 |
| CN | 101085818 A | 12/2007 |
| CN | 101186663 A | 5/2008 |
| CN | 101260164 A | 9/2008 |
| CN | 102464745 A | 5/2012 |

* cited by examiner

*Primary Examiner* — Nathan M Nutter
(74) *Attorney, Agent, or Firm* — Finnegan, Henderson, Farabow, Garrett & Dunner, LLP

(57) ABSTRACT

The method for preparation of polyisoprene includes conducting polymerization reaction of isoprene in a first organic solvent under the presence of rare earth catalyst I and rare earth catalyst II, to obtain polyisoprene with bimodal molecular weight distribution, wherein the polymerization reaction conditions are controlled to ensure the peak molecular weight of the high molecular weight component fraction in the polyisoprene is $1 \times 10^6$-$2 \times 10^6$ and the peak molecular weight of the low molecular weight component fraction is $2 \times 10^5$-$4 \times 10^5$, and the weight ratio of content of the high molecular weight component fraction to the low molecular weight component fraction is 1-25:1. The molecular weight distribution of the polyisoprene obtained with the method provided is bimodal distribution; therefore, the polyisoprene not only has the mechanical properties of polyisoprene with high molecular weight, but also has the processability of polyisoprene with low molecular weight.

20 Claims, No Drawings

POLYISOPRENE, PREPARATION METHOD THEREOF, POLYISOPRENE RUBBER COMPOUNDS AND VULCANIZATE THEREFROM

FIELD OF THE INVENTION

The present invention relates to a polyisoprene, a method for preparation of polyisoprene, the polyisoprene prepared with the method, and a polyisoprene rubber compounds and a polyisoprene vulcanizate prepared from the polyisoprene.

BACKGROUND OF THE INVENTION

Natural rubber is a rubber with the best physical and mechanical properties. Crude rubber, rubber compounds and vulcanizates of natural rubber all have outstanding strength, elongation, and elasticity, etc. The outstanding properties of natural rubber largely benefit from the high molecular weight of natural rubber. The weight-average molecular weight of natural rubber is usually higher than 1 million. However, high molecular weight of rubber always results in poor processability; but natural rubber has favorable processability. The Mooney viscosity of rubber is an important index that characterizes the processability of rubber. If the Mooney viscosity is higher than 90, the processability is usually poor. The Mooney viscosity of natural rubber is usually approx. 60-70, which can fully meet the processing requirement, because natural rubber has unique molecular weight distribution. It is generally agreed that the molecular weight distribution of natural rubber is bimodal distribution, in which a high molecular weight peak endows outstanding physical and mechanical properties to natural rubber, and a peak or "shoulder" in the low molecular weight region provides an effect of plasticizing agent and endows favorable processability to natural rubber.

High-cis polyisoprene prepared through a synthesis process is reputed as "synthetic natural rubber" and is the best substitute for natural rubber, because its structure is similar to that of natural rubber. Rare earth catalysts have high catalytic activity, high cis selectivity, and high molecular weight, and are regarded as catalysts most suitable for preparation of polyisoprene. Though polyisoprene with high molecular weight can be prepared with rare earth catalysts, the molecular weight distribution of the polyisoprene is unimodal distribution and covers a very narrow range. For example, a rare earth catalyst and a method for preparation of polyisoprene with the rare earth catalyst are disclosed in Chinese Patent Application CN101045768A, and the rare earth catalyst is disclosed as consisting of the following components: aluminum alkyl, chlorides, conjugated diene, and neodymium carboxylate, and the mole ratio of the components is 5-30:1-4:5-20:1; the weight-average molecular weight of polyisoprene prepared with that method can be as high as 1.43 millions, but the molecular weight distribution is unimodal distribution and the molecular weight distribution index is not more than 3.0. The polyisoprene with high molecular weight in unimodal distribution has poor processability, can't be mixed homogeneously with auxiliary agents such as carbon black and sulfur, has adverse effect to the performance of final product, and may even have loose, separation, and poor viscosity phenomena, resulting in processing failure (see Collection of Articles on Rare Earth Catalyzed Synthetic Rubber, the Fourth Research Department of CAS Changchun Institute of Applied Chemistry, Science Express, 1980, p 365-370). To facilitate the processing of polyisoprene, usually the following two solutions are used: the first solution is to decrease the molecular weight of polyisoprene so as to ensure the processability of the polymer, at the cost of physical and mechanical properties; for example, a method of introducing aromatic hydrocarbons into the catalyst system to decrease the molecular weight of the polymer is disclosed in Chinese Patent Application CN1295087A, and a method of introducing 3d transition metallic organic compounds into the catalyst system to decrease the molecular weight of the polymer is disclosed in Chinese Patent Application CN1342718A; the second solution is to widen the range of molecular weight distribution of polyisoprene, and thereby synthesize a polyisoprene with wide and steamed bread shaped unimodal molecular weight distribution; however, such polyisoprene doesn't exhibit outstanding physical and mechanical properties and high processability simultaneously, and still has a gap to natural rubber in terms of physical and mechanical properties and processability.

Presently, the research in preparation of polymer with bimodal molecular weight distribution is commonly seen in the synthetic polyolefin resin domain. The methods include melt bending method, staged reaction method, and dual active center catalyst method; with the former two methods, it is difficult to obtain homogeneously mixed polymer products with bimodal distribution, and the preparation process is complex and results in high cost; relatively ideal polymer products with bimodal distribution can be obtained with the dual active center catalyst method (see CN101085818A). The research in preparation of polymer with bimodal distribution is rarely seen in the synthetic rubber domain. The Chinese Patent Application CN101085818A discloses a dual active center catalyst, which can be used to synthesize polydiene with bimodal distribution, wherein, the peak molecular weight of high molecular weight component fraction is $6.5 \times 10^5$-$9.0 \times 10^5$, the peak molecular weight of low molecular weight component fraction is $1.0 \times 10^5$-$2.2 \times 10^5$, and the content of polydiene in cis-1,4-structure is higher than 96%; in addition, the catalyst is disclosed as comprising neodymium carboxylate compounds, organo-aluminum compounds, halogen-containing compounds, and $C_6$-$C_{10}$ carboxylic acids. Owing to the fact that the macromolecular chains of polyisoprene will break under mechanical shearing action when polyisoprene is processed, for bimodal polyisoprene, the higher the molecular weight of the high molecular weight component fraction is, the better the performance of polyisoprene will be, provided that the processability is not affected adversely (the processability of rubber is usually poor if the Mooney viscosity is higher than 90). However, it is a pity that no significant advance has been made in the research for increasing the molecular weight of the high molecular weight component fraction in bimodal polyisoprene.

In addition, the content of polyisoprene in cis structure in polyisoprene compound is also an important influencing factor for the performance of the polyisoprene compound, besides molecular weight and molecular weight distribution. In the polyisoprene prepared with the rare earth catalyst disclosed in CN85102250A, CN1834121A, or CN101045768A, the content of polyisoprene in cis-1,4-structure is usually approx. 96%; therefore, the performance of the polyisoprene is inferior to the performance of polyisoprene prepared with titanium-based catalysts, in which the content of polyisoprene in cis-1,4-structure is higher than 98% (see Collection of Articles on Rare Earth Catalyzed Synthetic Rubber, the Fourth Research Department of CAS Changchun Institute of Applied Chemistry, Science Express, 1980, p 70-82). Even if the content of polyisoprene in cis-1,4-structure in polyisoprene compound is increased slightly, the performance of the polyisoprene compound will be improved significantly (see Collection of Articles on Rare Earth Catalyzed Synthetic Rubber, the Fourth Research Department of CAS Changchun Institute of Applied Chemistry, Science Express, 1980, p 255-265). A method for preparation of polyisoprene with content of cis-1,4-structure higher than 98% is disclosed in CN1479754A and CN101186663A, but the method requires a non-homogeneous catalyst and/or demanding harsh process conditions.

SUMMARY OF THE INVENTION

To overcome the above-mentioned drawbacks existing in prior methods for preparation of polyisoprene, the present invention provides a polyisoprene with bimodal molecular weight distribution, a method for preparation of the polyisoprene, the polyisoprene prepared with the method and polyisoprene rubber compounds and vulcanizate produced from the polyisoprene.

The present invention provides a polyisoprene, which possesses bimodal molecular weight distribution as measured in GPC test, the peak molecular weight of high molecular weight component fraction is $1\times10^6$-$2\times10^6$, the peak molecular weight of low molecular weight component fraction is $2\times10^5$-$4\times10^5$, and the weight ratio of content of the high molecular weight component fraction to the low molecular weight component fraction is 1-25:1.

The present invention further provides a method for preparation of polyisoprene comprising conducting polymerization reaction of isoprene in a first organic solvent under the presence of rare earth catalyst I and rare earth catalyst II, to obtain polyisoprene with bimodal molecular weight distribution, wherein the polymerization reaction conditions are controlled to ensure the peak molecular weight of the high molecular weight component fraction in the polyisoprene is $1\times10^6$-$2\times10^6$ and the peak molecular weight of the low molecular weight component fraction is $2\times10^5$-$4\times10^5$, and the weight ratio of the high molecular weight component fraction to the low molecular weight component fraction is 1-25:1; the rare earth catalyst I is obtained by contacting materials A, B and D with each other in a second organic solvent and treating them through a first aging process, and then adding material C and treating through a second aging process; the rare earth catalyst II is obtained by contacting materials A, C and D with each other in a third organic solvent and treating them through a third aging process, and then adding material B and treating through a fourth aging process; wherein, material A is neodymium carboxylate, material B is an aluminum alkyl compound, material C is a halogen-containing compound, and material D is conjugated diene; the first aging process, second aging process, third aging process, and fourth aging process are carried out under the same conditions or different conditions.

The present invention further provides a polyisoprene prepared with the above method.

The present invention further provides polyisoprene rubber compounds with bimodal distribution produced from the polyisoprene provided by the present invention.

The present invention further provides a polyisoprene vulcanizate with bimodal distribution produced from the polyisoprene provided by the present invention.

The method for preparation of polyisoprene provided by the present invention tactfully employs two different rare earth catalysts, so as to directly produce polyisoprene with specific bimodal molecular weight distribution, specific content of component at High molecular weight component fraction, and specific content of component at low molecular weight component fraction in a single autoclave. The method is simple, and is suitable for use in industrial production. It is conjectured that the rare earth catalyst I and rare earth catalyst II prepared as described above have different active center structures; therefore, the two rare earth catalysts have different properties, and can catalyze monomer polymerization to obtain polymer compounds different in molecular weight. In addition, the molecular weight distribution of the polyisoprene obtained with the method provided in the present invention is bimodal distribution; therefore, the polyisoprene not only has the mechanical properties of polyisoprene with high molecular weight, but also has the processability of polyisoprene with low molecular weight.

Since the polyisoprene with bimodal molecular weight distribution provided by the present invention is directly obtained through a polymerization reaction, it has significantly superior homogeneity when compared to polymer mixture with the same peak molecular weights obtained by mixing two polyisoprene compounds with unimodal molecular weight distribution that are different in molecular weight; in addition, the preparation method is simpler, since the time-consuming and labor-consuming mixing procedure is omitted. Therefore, the polyisoprene provided by the present invention has apparent economic advantages. Moreover, polyisoprene rubber compounds produced from the polyisoprene has higher tensile strength and/or better processability.

Other characteristics and advantages of the present invention will be further detailed in the embodiments hereunder.

DETAILED DESCRIPTION OF THE EMBODIMENTS

Hereunder the embodiments of the present invention will be detailed. It should be appreciated that the embodiments described here are only provided to describe and explain the present invention, but shall not be deemed as constituting any limitation to the present invention.

The polyisoprene provided in the present invention possesses bimodal molecular weight distribution as measured in GPC test, the peak molecular weight of high molecular weight component fraction is $1\times10^6$-$2\times10^6$, the peak molecular weight of low molecular weight component fraction is $2\times10^5$-$4\times10^5$, and the weight ratio of the high molecular weight component fraction to the low molecular weight component fraction is 1-25:1.

In the present invention, the polyisoprene possesses bimodal molecular weight distribution as measured in GPC test, which means all the polyisoprene product obtained through the same reaction has bimodal molecular weight distribution, i.e., for all the polyisoprene product obtained through the same reaction, when tested under the same GPC test conditions by random sampling, the molecular weight distribution always exhibits bimodal distribution.

In the present invention, the peak molecular weight of the high molecular weight component fraction in the polyisoprene is measured as $1\times10^6$-$2\times10^6$ in GPC test, and the peak molecular weight of the low molecular weight component fraction is measured as $2\times10^5$-$4\times10^5$, which means, for all the polyisoprene product obtained through the same reaction, when tested under the same GPC test conditions by random sampling, the molecular weight distribution always exhibits bimodal distribution, and the peak molecular weights of the high molecular weight component fraction and of the low molecular weight component fraction measured in each GPC test for different samples are within above ranges; in addition, for all the polyisoprene product obtained through the same reaction, when tested by random sampling, the difference between maximum value and minimum value of peak molecular weight of the high molecular weight component fraction is always $2\times10^5$ or less, and the difference between maximum value and minimum value of peak molecular weight of the low molecular weight is always $2\times10^4$ or less.

In the present invention, the weight ratio of the high molecular weight component fraction to the low molecular weight component fraction in the polyisoprene with bimodal molecular weight distribution is measured as 1-25:1 in the GPC, which means for all the polyisoprene product obtained through the same reaction, when tested by random sampling, the error of weight ratio of the high molecular weight component fraction to the low molecular weight component fraction in the polyisoprene is always 5% or less.

Wherein, random sampling means there is no restriction for the sampling positions and sampling number. In actual operation, after the polyisoprene product is taken out of the polymerization autoclave, usually 5-20 samples can be taken from symmetric positions in upper part, middle part, lower part, inner part, and outer part of the polyisoprene product respectively, and then tested by GPC test under the same conditions. The error is calculated as: error=(maximum value−minimum value)/average value*100%.

Wherein, the peak molecular weight refers to the molecular weight corresponding to the peak elution volume, i.e., the molecular weight of the highest content fraction. The peak molecular weight can be measured with a gel permeation chromatograph (GPC).

In the present invention, to achieve a better balance between the mechanical properties and the processability of the polyisoprene, the weight ratio of the high molecular weight component fraction and the low molecular weight component fraction is preferably 5-20:1. The weight contents of the high molecular weight component fraction and the low molecular weight component fraction can be measured with a method well known by those skilled in the art. For example, they can be measured with a gel permeation chromatograph (GPC). More preferably, the content of polyisoprene in cis-1,4-structure in the polyisoprene is higher than 98%; further preferably, all the polyisoprene is in cis-1,4-structure, or, the polyisoprene is a mixture of polyisoprene in cis-1,4-structure and polyisoprene in cis-3,4-structure and the content of polyisoprene in cis-1,4-structure is higher than 98%.

The method for preparation of polyisoprene provided in the present invention comprising conducting polymerization reaction of isoprene in a first organic solvent under the presence of rare earth catalyst I and rare earth catalyst II, to obtain polyisoprene with bimodal molecular weight distribution, wherein the polymerization reaction conditions are controlled to ensure the peak molecular weight of the high molecular weight component fraction in the polyisoprene is $1\times10^6$-$2\times10^6$ and the peak molecular weight of the low molecular weight component fraction is $2\times10^5$-$4\times10^5$, and the weight ratio of the high molecular weight component fraction to the low molecular weight component fraction is 1-25:1; the rare earth catalyst I is obtained by contacting materials A, B and D with each other in a second organic solvent and treating them through a first aging process, and then adding material C and treating through a second aging process; the rare earth catalyst II is obtained by contacting materials A, C and D with each other in a third organic solvent and treating them through a third aging process, and then adding material B and treating through a fourth aging process; wherein, material A is neodymium carboxylate, material B is an aluminum alkyl compound, material C is a halogen-containing compound, and material D is conjugated diene; the first aging process, second aging process, third aging process, and fourth aging process are carried out under the same conditions or different conditions.

In the present invention, the neodymium carboxylate can be selected from a wide range, and all neodymium carboxylates commonly used in the art can be used to realize the object of the present invention. For example, the neodymium carboxylate can be $C_1$-$C_{20}$ neodymium carboxylate, preferably $C_6$-$C_{10}$ neodymium carboxylate, more preferably selected from one or more of neodymium naphthenate, neodymium n-octoate, neodymium iso-octoate, neodymium pelargonate, neodymium neodecanoate, and neodymium n-decanoate.

In the present invention, the aluminum alkyl compound can be selected from a wide range, and all aluminum alkyl compounds commonly used in the art can be used to attain the object of the present invention. For example, the aluminum alkyl compound can be selected from aluminum alkyl compounds represented by general formula $AlR_3$ and/or $AlHR_2$, wherein, R is $C_1$-$C_6$ alkyl; the aluminum alkyl compound is preferably selected from one or more of trimethyl aluminum, triethyl aluminum, tripropyl aluminum, tributyl aluminum, triisobutyl aluminum, tripentyl aluminum, trihexyl aluminum, diethyl aluminum hydride, dibutyl aluminum hydride, and diisobutyl aluminum hydride, more preferably selected from one or more of tributyl aluminum, triisobutyl aluminum, dibutyl aluminum hydride, and diisobutyl aluminum hydride.

In the present invention, the halogen-containing compound can be selected from a wide range, and all halogen-containing compounds commonly used in the art can be used to attain the object of the present invention. For example, the halogen-containing compound can be selected from aluminum alkyl halides represented by general formula $AlR_2X$, sesqui-aluminum alkyls represented by general formula $Al_2R_3X_3$, halogenated hydrocarbons represented by general formula RX, and halogenated silanes represented by general formula $R'_nX_{4-n}Si$, wherein, R is ethyl, n-propyl, isopropyl, n-butyl, isobutyl, tertiary butyl, benzyl, or allyl, X is bromine or chlorine, R' is methyl, ethyl, n-propyl, or isopropyl, and n is an integer within 0-3 range. For example, the halogenated silanes can be trimethyl chlorosilane and silicon tetrachloride. Preferably, the halogen-containing compound is selected from one or more of aluminum diethyl monochloride, aluminum diisobutyl monochloride, ethyl aluminum sesqui chloride, and isobutyl aluminum sesqui chloride.

In the present invention, the conjugated diene can be selected from a wide range, and all conjugated dienes commonly used in the art can be used to realize the object of the present invention. For example, the conjugated diene can be $C_4$-$C_6$ conjugated diene, preferably selected from one or more of butadiene, isoprene, 1,3-pentylene, 1,3-hexadiene, and 2,3-dimethyl butadiene, more preferably is butadiene and/or isoprene.

In the present invention, when the rare earth catalyst I and catalyst II are prepared, the dosage of the components can be selected vary in a wide range. For example, when the rare earth catalyst I is prepared, the mol ratio of the components can be A:B:C:D=1:15-30:2-4:10-30; when the rare earth catalyst II is prepared, the mol ratio of the components can be A:B:C:D=1:8-20:2-4:40-70. In the present invention, for convenience of description, the two aging processes for preparing the rare earth catalyst I are referred to as "first aging process" and "second aging process" respectively, and the two aging processes for preparing the rare earth catalyst II are referred to as "third aging process" and "fourth aging process" respectively. The conditions of the first aging process, second aging process, third aging process, and fourth aging process can be determined as required, as long as they can ensure the components in rare earth catalyst I and rare earth catalyst II are mixed adequately and react fully, and thereby catalyze isoprene polymerization to obtain polyisoprene with the properties described above. However, to eliminate or reduce the adverse effect of the components of air to the aging process, preferably the first aging process, second aging process, third aging process, and fourth aging process are carried out in inert gas atmosphere. The inert gas atmosphere refers to any gas or gas mixture that doesn't have chemical action with the reactants and product, such as nitrogen and one or more of the zero-group gasses in the periodic table of elements. The conditions of the first aging process usually include: temperature: 30-60° C., time: 10-60 min; the conditions of the second aging process usually include: temperature: 10-30° C., time: 1-48 h; the conditions of the third aging process usually include: temperature: 0-30° C., time: 5-40 min; the conditions of the fourth aging process usually include: temperature: 0-30° C., time: 10-48 h; preferably, the conditions of the first aging process include: temperature: 40-50° C., time: 15-30 min; the conditions of the second aging process include: temperature: 15-25° C., time: 16-24 h; the conditions of the third aging process include: temperature: 5-15° C., time: 10-20 min; the conditions of the fourth aging process include: temperature: 10-20° C., time: 18-24 h.

In an embodiment of the present invention, the method for preparation of the rare earth catalyst I comprises: contacting component A with component D in a second organic solvent, adding component B and carrying out the first aging process for 10-60 min at 30-60° C., and then adding component C and carrying out the second aging process for 1-48 h at 10-30° C.; the mol ratio of the components is: A:B:C:D=1:15-30:2-4:10-30.

In another embodiment of the present invention, the method for preparation of the rare earth catalyst II comprises: contacting component A with D in a third organic solvent, adding component C and carrying out the third aging process for 5-40 min at 0-30° C., and then adding component B and carrying out the fourth aging process for 10-48 h at 0-30° C.; the mol ratio of the components is: A:B:C:D=1:8-20:2-4:40-70.

In the present invention, for convenience of description, the organic solvent that serves as reaction medium in the preparation process of the polyisoprene is referred to as "first organic solvent", the organic solvent that serves as reaction medium in the preparation process of the rare earth catalyst I is referred to as "second organic solvent", and the organic solvent that serves as reaction medium in the preparation process of the rare earth catalyst II is referred to as "third organic solvent". The first organic solvent, second organic solvent, and third organic solvent can be common organic solvents in the art, as long as they don't have chemical action with the reactants and reaction product. Usually, the first organic solvent, second organic solvent, and third organic solvent can be the same or different, and can be selected separately from one or more of aromatic hydrocarbon, saturated alkane, and naphthenic hydrocarbon; specifically, they can be selected separately from one or more of benzene, methyl benzene, ethyl benzene, xylene (including ortho-xylene, meta-xylene, and para-xylene), pentane and its isomers (e.g., n-pentane, isopentane, methyl cyclopentane, 2-methyl pentane, and 3-methyl pentane), hexane and its isomers (e.g., n-hexane, cyclohexane), heptane and its isomers (e.g., n-heptane), octane and its isomers (e.g., n-octane), cyclohexane, and raffinate oil. The dosages of the first organic solvent, second organic solvent, and third organic solvents can be selected normally according to the common practices in the art, and there is no special restriction for them. Usually, the dosage of the first organic solvent ensures the concentration of the isoprene is 5-30 wt. %; thus, the polymerization reaction can proceed stably and a high yield rate can be achieved. The dosages of the second organic solvent and third organic solvent ensure the total concentration of rare earth catalyst I and rare earth catalyst II is $1\times10^{-4}$-$1\times10^{-2}$ mol/L when calculated by component A, so that the aging process can proceed stably and rare earth catalysts with high activity can be obtained.

There is no special restriction on the dosages of the rare earth catalysts, which can be chosen appropriately according to the desired molecular weight of polymer. For example, for 1 mol isoprene, the total dosage of the rare earth catalyst I and rare earth catalyst II calculated by component A can be $1\times10^{-6}$-$5\times10^{-3}$ mol.

In the present invention, on one hand, the ratio of the high molecular weight component fraction to the low molecular weight component fraction in the obtained polyisoprene can be controlled by adjusting the dosages of the rare earth catalyst I and rare earth catalyst II, and thereby the mechanical properties and processability of the polyisoprene can be adjusted. The inventor has found: if the mol ratio of the rare earth catalyst I to rare earth catalyst II is 1:1-50 when calculated by component A, preferably 1:10-38, the weight ratio of the high molecular weight component fraction to the low molecular weight component fraction in the obtained polyisoprene will be 1-25:1, preferably 5-20:1, and the overall performance of the polyisoprene will be more outstanding. On the other hand, the ratio of the high molecular weight component fraction to the low molecular weight component fraction in the obtained polyisoprene can be controlled by adjusting the time interval between addition of the catalyst I and addition of the catalyst II, and thereby the mechanical properties and processability of the polyisoprene can be adjusted. The inventor has found: if the rare earth catalyst II is added and then the rare earth catalyst I is added, and the time interval between addition of the rare earth catalyst II and addition of the rare earth catalyst I is 20-120 min, preferably 60-90 min, the weight ratio of the high molecular weight component fraction to the low molecular weight component fraction in the obtained polyisoprene will be 1-25:1, preferably 5-20:1.

In the present invention, the conditions of the polymerization reaction can be conventional conditions of polymerization reaction in the art. However, to overcome oxygen inhibition and obtain polyisoprene with high molecular weight and narrow molecular weight distribution, preferably the polymerization reaction is carried out in inert gas atmosphere, wherein, the inert gas atmosphere refers to any gas or gas mixture that doesn't have chemical reaction with the reactants and product, such as nitrogen and one or more of the zero-group gasses in the periodic table of elements. The inert gas atmosphere can be maintained by feeding any gas or gas mixture that doesn't have chemical reaction with the reactants and product into the reaction system. The conditions of the polymerization reaction can include reaction temperature and reaction time. For example, the conditions of the polymerization reaction usually include: temperature: −60° C. to 80° C., time: 0.5-7 h; preferably, the conditions of the polymerization reaction include: temperature: −30° C. to 60° C., time: 1-3 h.

In the present invention, after the polymerization reaction is completed, the active polymer can be deactivated with a common method in the art. For example, a termination agent can be added into the polymerization reaction system to deactivate the active polymer chains. The species and dosage of the termination agent can be selected conventionally in the art, and there is no special restriction on them, as long as the termination agent can deactivate the polymer chains with active end groups. Usually, the termination agent can be selected from one or more of water, C1-C6 aliphatic alcohols, C4-C12 aliphatic carboxylic acids, and aryl polyhydroxylated compounds. The aryl polyhydroxylated compounds refer to compounds generated by displacing at least two hydrogen atoms on the benzene ring with hydroxyl radicals. Preferably, the termination agent is composed of one or more of water, methanol, ethanol, isopropanol, and 2,6-diteriary-butyl hydroquinone. There is no special restriction on the dosage of the termination agent in the present invention, as long as the dosage of the termination agent is enough to deactivate the active substances in the polymerized product. Therefore, the dosage of the termination agent will not be detailed any more here.

In the present invention, the polymerization reaction can be conducted intermittently or continuously in a single autoclave, or conducted continuously in multiple autoclaves connected in series, or conducted continuously in multiple autoclaves connected in parallel and then in multiple autoclaves connected in series.

Moreover, the present invention provides polyisoprene prepared with the method described above.

The present invention also provides polyisoprene rubber compounds and polyisoprene vulcanizate prepared from the polyisoprene provided by the present invention.

The polyisoprene prepared with the method described above has extremely high homogeneity.

Measured in GPC test, the molecular weight distribution of polyisoprene sampled at any position is bimodal distribution, the peak molecular weight of the high molecular weight component fraction is $1 \times 10^6$-$2 \times 10^6$, the peak molecular weight of the low molecular weight component fraction is $2 \times 10^5$-$4 \times 10^5$, the weight ratio of the high molecular weight component fraction to the low molecular weight component fraction is 1-25:1, preferably 5-20:1, and the error in the same parameter between different samples is always smaller than 5%. The content of polyisoprene in cis-1,4-structure in the polyisoprene is higher than 98%; preferably, all the polyisoprene is in cis-1,4-structure, or, the polyisoprene is a mixture of polyisoprene in cis-1,4-structure and polyisoprene in cis-3,4-structure and the content of polyisoprene in cis-1,4-structure is higher than 98%.

The main difference between the polyisoprene rubber compounds provided in the present invention and other polyisoprene rubber compounds mixes lies in: the polyisoprene rubber compounds in the present invention are prepared from polyisoprene, and the preparation method can be selected from existing methods in the prior art. For example, the polyisoprene rubber compounds can be obtained by means of banbury mixing the polyisoprene with a rubber mixing additive. The species and dosage of the rubber mixing additive can be determined with reference to the prior art. For example, the rubber mixing additive can be composed of one or more of vulcanizing agent and carbon black, etc. The specific mixing operations and conditions can also be determined with reference to the prior art.

The main difference between the polyisoprene vulcanizate provided by the present invention and other polyisoprene vulcanizates lies in: the polyisoprene vulcanizate in the present invention are prepared from polyisoprene provided by the present invention, and the preparation method can be selected from existing methods in the prior art. For example, the vulcanizate can be obtained through a vulcanization process, in which the polyisoprene contacts with a vulcanizing agent under rubber vulcanization conditions. The species and dosage of the vulcanizing agent can be determined with reference to the prior art, and the specific vulcanizing operations and conditions can also be determined with reference to the prior art.

Hereunder the present invention will be further detailed in some examples.

In the following examples and comparative examples, the molecular weight and molecular weight distribution of the polymer, and the weight ratio of the high molecular weight component fraction to the low molecular weight component fraction are measured with a Shimadzu LC-10AT gel permeation chromatograph (GPC), wherein, THF is the fluid phase, polystyrene with narrow molecular weight distribution is used as the standard sample, and the temperature is 25° C.; the content of polystyrene in cis structure is measured with a Bruker 400 MHz nuclear magnetic resonance (NMR) spectrometer, and the solvent is deuterated chloroform; the Mooney viscosity is measured with an automatic Mooney viscosity meter (SMV-300, from Shimadzu Corporation), and the test temperature is 100° C.

Preparation Example 1

This preparation example is provided to describe the rare earth catalyst I and preparation method thereof provided by the present invention.

Under nitrogen protection, mix 180 ml 0.05 mol/L hexane solution of neodymium neodecanoate, 0.225 mol butadiene, and 2 kg hexane to homogeneous state, adjust the temperature to 50° C., add 114 ml 2 mol/L hexane solution of diisobutyl aluminum hydride, and then carry out aging for 15 min; then, cool down to 25° C., add 28 ml 0.8 mol/L hexane solution of aluminum diethyl monochloride, and continue aging for 16 h, to obtain a rare earth catalyst C11.

Preparation Example 2

This preparation example is provided to describe the rare earth catalyst I and preparation method thereof provided by the present invention.

Under nitrogen protection, mix 120 ml 0.05 mol/L hexane solution of neodymium neodecanoate, 0.09 mol butadiene, and 0.3 kg hexane to homogeneous state, adjust the temperature to 40° C., add 45 ml 2 mol/L hexane solution of diisobutyl aluminum hydride, and then carry out aging for 30 min; then, cool down to 15° C., add 22.5 ml 0.8 mol/L hexane solution of aluminum diethyl monochloride, and continue aging for 24 h, to obtain a rare earth catalyst C12.

Preparation Example 3

This preparation example is provided to describe the rare earth catalyst I and preparation method thereof provided by the present invention.

Under nitrogen protection, mix 50 ml 0.025 mol/L hexane solution of neodymium neodecanoate, 0.038 mol isoprene, and 2 kg hexane to homogeneous state, adjust the temperature to 60° C., add 38 ml 1 mol/L hexane solution of triisobutyl aluminum, and then carry out aging for 10 min; then, cool down to 10° C., add 13 ml 0.2 mol/L hexane solution of aluminum diethyl monochloride, and continue aging for 48 h, to obtain a rare earth catalyst C13.

Preparation Example 4

This preparation example is provided to describe the rare earth catalyst I and preparation method there of provided by the present invention.

Under nitrogen protection, mix 100 ml 0.025 mol/L hexane solution of neodymium neodecanoate, 0.025 mol butadiene, and 2 kg hexane to homogeneous state, adjust the temperature to 30° C., add 25 ml 1 mol/L hexane solution of diisobutyl aluminum hydride, and then carry out aging for 60 min; then, add 50 ml 0.2 mol/L hexane solution of aluminum diethyl monochloride, and continue aging for 1 h, to obtain a rare earth catalyst C14.

Preparation Example 5

This preparation example is provided to describe the rare earth catalyst II and preparation method thereof provided by the present invention.

Under nitrogen protection, mix 200 ml 0.05 mol/L hexane solution of neodymium neodecanoate, 0.50 mol isoprene, and 0.95 kg hexane to homogeneous state, adjust the temperature to 15° C., add 60 ml 0.5 mol/L hexane solution of aluminum diethyl monochloride, and then carry out aging for 10 min; then, cool down to 10° C., add 125 ml 0.8 mol/L hexane solution of triisobutyl aluminum, and continue aging for 24 h, to obtain a rare earth catalyst C21.

Preparation Example 6

This preparation example is provided to describe the rare earth catalyst II and preparation method thereof provided by the present invention.

Under nitrogen protection, mix 200 ml 0.05 mol/L hexane solution of neodymium neodecanoate, 0.60 mol isoprene, and 2 kg hexane to homogeneous state, adjust the temperature to 5° C., add 50 ml 0.5 mol/L hexane solution of aluminum diethyl monochloride, and then carry out aging for 20 min; then, heat up to 20° C., add 190 ml 0.8 mol/L hexane solution of triisobutyl aluminum, and continue aging for 18 h, to obtain a rare earth catalyst C22.

Preparation Example 7

This preparation example is provided to describe the rare earth catalyst II and preparation method thereof provided by the present invention.

Under nitrogen protection, mix 150 ml 0.05 mol/L hexane solution of neodymium neodecanoate, 0.52 mol isoprene, and 0.6 kg hexane to homogeneous state, adjust the temperature to 0° C., add 30 ml 0.5 mol/L hexane solution of aluminum diethyl monochloride, and then carry out aging for 40 min; then, heat up to 30° C., add 190 ml 0.8 mol/L hexane solution of triisobutyl aluminum, and continue aging for 10 h, to obtain a rare earth catalyst C23.

Preparation Example 8

This preparation example is provided to describe the rare earth catalyst II and preparation method thereof provided by the present invention.

Under nitrogen protection, mix 150 ml 0.05 mol/L hexane solution of neodymium neodecanoate, 0.30 mol isoprene, and 0.3 kg hexane to homogeneous state, adjust the temperature to 30° C., add 60 ml 0.5 mol/L hexane solution of aluminum diethyl monochloride, and then carry out aging for 5 min; then, cool down to 0° C., add 75 ml 0.8 mol/L hexane solution of triisobutyl aluminum, and continue aging for 48 h, to obtain a rare earth catalyst C24.

Example 1

This example is provided to describe the polyisoprene and preparation method thereof provided by the present invention.

Under nitrogen protection, at 35° C., mix 300 g isoprene, 60 ml rare earth catalyst C24 obtained in the preparation example 8, and 1800 g hexane to homogeneous state in a polymerization autoclave, and agitate for 30 min; then, add 7.5 ml mixed liquid of rare earth catalyst C11 obtained in the preparation example 1 and 200 g hexane, and keep on agitation and maintain the reaction for 2 h, to obtain a solution containing polymer. Discharge the solution containing polymer from the autoclave, add 100 ml 3 wt. % ethanol solution of 2,6-diteriarybutyl hydroquinone to terminate the reaction, remove the organic solvent and dry the polymer, to obtain 226 g polyisoprene; the convention rate is 75%. As measured in test, the content of polyisoprene in cis-1,4-structure in the polyisoprene is 98.1%, and the Mooney viscosity of the polyisoprene is 72. Make the obtained polyisoprene product into a cuboid-shaped specimen in approx. 10 cm in length and approx. 5 cm in width and height, take samples from the centers of the six sides and the center of the cuboid-shaped specimen, and test the samples. The test results are shown in Table 1. It is seen from Table 1: among the 7 test results, the difference between maximum value and minimum value of peak molecular weight of the high molecular weight component fraction is $1.1 \times 10^5$, the difference between maximum value and minimum value of peak molecular weight of the low molecular weight component fraction is $0.9 \times 10^4$, and the error of weight ratio of the high molecular weight component fraction to the low molecular weight component fraction is 4.3%. Wherein, the error is calculated as: error=(maximum value−minimum value)/average value*100%. The testing method and error calculation method used in other examples and comparative examples are the same as those used in this example.

TABLE 1

| Sampling Position | Peak Pattern | Molecular Weight of High Molecular Weight component fraction | Molecular Weight of low Molecular Weight component fraction | Weight Ratio of Content of Component at High Molecular Weight component fraction to Component at Low Molecular Weight component fraction |
|---|---|---|---|---|
| Top side | Bimodal | $1.23 \times 10^6$ | $2.82 \times 10^5$ | 14.25 |
| Bottom side | Bimodal | $1.17 \times 10^6$ | $2.76 \times 10^5$ | 14.18 |
| Left side | Bimodal | $1.25 \times 10^6$ | $2.85 \times 10^5$ | 14.63 |
| Right side | Bimodal | $1.20 \times 10^6$ | $2.81 \times 10^5$ | 14.23 |
| Front side | Bimodal | $1.28 \times 10^6$ | $2.77 \times 10^5$ | 14.80 |
| Rear side | Bimodal | $1.22 \times 10^6$ | $2.82 \times 10^5$ | 14.25 |
| Center | Bimodal | $1.24 \times 10^6$ | $2.81 \times 10^5$ | 14.58 |
| Difference/error | Both are bimodal | $1.1 \times 10^5$ | $0.9 \times 10^4$ | 4.3% |

Example 2

This example is provided to describe the polyisoprene and preparation method thereof provided by the present invention.

Under nitrogen protection, at 35° C., mix 300 g isoprene, 140 ml rare earth catalyst C21 obtained in the preparation example 5, and 1800 g hexane to homogeneous state in a polymerization autoclave, and agitate for 30 min; then, add 140 ml rare earth catalyst C13 obtained in the preparation example 3, and keep on agitation and maintain the reaction for 3 h, to obtain a solution containing polymer. Discharge the solution containing polymer from the autoclave, add 100 ml 3 wt. % ethanol solution of 2,6-diteriarybutyl hydroquinone to terminate the reaction, remove the organic solvent and dry the polymer, to obtain 218 g polyisoprene; the convention rate is 73%. As measured in test, the content of polyisoprene in cis-1,4-structure in the polyisoprene is 98.2%, and the Mooney viscosity of the polyisoprene is 67. Take samples from the dried polyisoprene with the method described in example 1 and test the samples in GPC Test. The test results are shown in Table 2. It is seen from Table 2: among the 7 test results, the difference between maximum value and minimum value of peak molecular weight of the high molecular weight component fraction is $1.2 \times 10^5$, the difference between maximum value and minimum value of peak molecular weight of the low molecular weight component fraction is $0.6 \times 10^4$, and the error of weight ratio of high molecular weight component fraction to the low molecular weight component fraction is 0.8%.

add 80 ml 3 wt. % ethanol solution of 2,6-diteriarybutyl hydroquinone to terminate the reaction, remove the organic solvent and dry the polymer, to obtain 252 g polyisoprene; the convention rate is 84%. As measured in test, the content of polyisoprene in cis-1,4-structure in the polyisoprene is 98.5%; the molecular weight distribution is unimodal distribution, the peak molecular weight is $1.13 \times 10^6$, the number-average molecular weight is $5.6 \times 10^5$, the molecular weight distribution factor is 2.41, and the Mooney viscosity is 97.

(2) Under nitrogen protection, at 40° C., mix 300 g isoprene, 300 ml rare earth catalyst C12 obtained in the preparation example 2, and 2000 g hexane to homogeneous state in a polymerization autoclave, and agitate and maintain the reaction for 1.5 h, to obtain a solution containing polymer. Discharge the solution containing polymer from the autoclave, add 100 ml 3 wt. % ethanol solution of 2,6-diteriarybutyl hydroquinone to terminate the reaction, remove the organic solvent and dry the polymer, to obtain 246 g polyisoprene; the convention rate is 82%. As measured in test, the content of polyisoprene in cis-1,4-structure in the polyisoprene is 95.6%; the molecular weight distribution is unimodal distribution, the peak molecular weight is $2.45 \times 10^5$, the number-average molecular weight is $6.68 \times 10^4$, and the molecular weight distribution factor is 3.85.

(3) Load the above two types of polyisoprene obtained with the methods in step (1) and step (2) in 8.4:1 weight ratio (high molecular weight:low molecular weight) into an internal mixer for mixing. Specifically, the mixing steps are: set the initial temperature of the internal mixer to 60° C.; close the

TABLE 2

| Sampling Position | Peak Pattern | Molecular Weight of High Molecular Weight component fraction | Molecular Weight of low Molecular Weight component fraction | Weight Ratio of Content of Component at High Molecular Weight component fraction to Component at Low Molecular Weight component fraction |
|---|---|---|---|---|
| Top side | Bimodal | $1.15 \times 10^6$ | $2.42 \times 10^5$ | 8.42 |
| Bottom side | Bimodal | $1.19 \times 10^6$ | $2.48 \times 10^5$ | 8.45 |
| Left side | Bimodal | $1.15 \times 10^6$ | $2.48 \times 10^5$ | 8.41 |
| Right side | Bimodal | $1.08 \times 10^6$ | $2.45 \times 10^5$ | 8.40 |
| Front side | Bimodal | $1.11 \times 10^6$ | $2.42 \times 10^5$ | 8.42 |
| Rear side | Bimodal | $1.12 \times 10^6$ | $2.44 \times 10^5$ | 8.42 |
| Center | Bimodal | $1.07 \times 10^6$ | $2.45 \times 10^5$ | 8.38 |
| Difference/error | Both are bimodal | $1.2 \times 10^5$ | $0.6 \times 10^4$ | 0.8% |

Comparative Example 1

This comparative example is provided to describe polyisoprene and preparation method thereof for comparison.

(1) Under nitrogen protection, at 20° C., mix 300 g isoprene, 150 ml rare earth catalyst C21 obtained in the preparation example 5, and 2000 g hexane to homogeneous state in a polymerization autoclave, and agitate and maintain the reaction for 3.5 h, to obtain a solution containing polymer. Discharge the solution containing polymer from the autoclave, discharge port, set the motor speed to 77 r/min, start the electric motor, and raise the ram. Cut the two types of polyisoprene into blocks in approx. 50 g weight, and load them into the internal mixer in alternate. Lower the ram, carrying out mixing for 4 min; then, raise the ram again, clean up the inlet of the internal mixer and the top of the ram, and then lower the ram again. Continue the mixing for 4 min, and then discharge the product. Take samples from the obtained compound mix with the method described in example 1, and test the samples in GPC test. The test results are shown in Table 3.

TABLE 3

| Sampling Position | Peak Pattern | Molecular Weight of High Molecular Weight component fraction | Molecular Weight of low Molecular Weight component fraction | Weight Ratio of Content of Component at High Molecular Weight component fraction to Component at Low Molecular Weight component fraction |
|---|---|---|---|---|
| Top side | Unimodal | $9.72 \times 10^5$ | — | — |
| Bottom side | Bimodal | $6.85 \times 10^5$ | $1.76 \times 10^5$ | 0.61 |
| Left side | Unimodal | $8.22 \times 10^5$ | — | — |
| Right side | Bimodal | $9.92 \times 10^5$ | $2.23 \times 10^5$ | 0.20 |
| Front side | Unimodal | $2.04 \times 10^5$ | — | — |
| Rear side | Unimodal | $7.41 \times 10^5$ | — | — |
| Center | Bimodal | $6.44 \times 10^5$ | $1.45 \times 10^5$ | 0.47 |
| Difference/error | Unimodal or Bimodal | $7.88 \times 10^5$ | $7.8 \times 10^4$ | 96% |

It is seen from the comparison between the data in Table 1 and Table 3: the peak molecular weight of the high molecular weight component fraction decreases to some degree in Table 3, and the weight ratio of the high molecular weight component fraction to the low molecular weight component fraction decreases significantly. The reason for that phenomenon may be: the high shearing force in the mixing process exerts some shearing effect on the polymer. Thus, it can be seen that the mixing process can't improve homogeneity, and can't ensure the content and peak molecular weight of the high molecular weight component fraction.

Comparative Example 2

This comparative example is provided to describe polyisoprene and preparation method thereof for comparison.

Fill hexane solution of polyisoprene with unimodal distribution obtained with the method in step (1) in comparative example 1 and hexane solution of polyisoprene with unimodal distribution obtained with the method in step (2) in comparative example 1 at 8.4:1 weight ratio of dry polymer into a 5 L stainless steel autoclave with a double helical ribbon mixer for mixing. Carry out agitation and mixing at 50° C. constant temperature for 1 h; then discharge the mixed liquid from the autoclave, remove the organic solvent, and dry the mixed polyisoprene, to obtain polyisoprene rubber compounds. Take samples from the obtained rubber compounds with the method described in example 1, and test the samples in GPC test. The test results are shown in Table 4.

Example 3

This example is provided to describe the polyisoprene and preparation method thereof provided by the present invention.

Under nitrogen protection, at 30° C., mix 300 g isoprene, 140 ml rare earth catalyst C21 obtained in the preparation example 5, and 1800 g hexane to homogeneous state in a polymerization autoclave, and agitate for 1.5 h; then, add 7.5 ml mixed liquid of rare earth catalyst C11 obtained in the preparation example 1 and 200 g hexane, and keep on agitation and maintain the reaction for 1 h, to obtain a solution containing polymer. Discharge the solution containing polymer from the autoclave, add 100 ml 3 wt. % ethanol solution of 2,6-diteriarybutyl hydroquinone to terminate the reaction, remove the organic solvent and dry the polymer, to obtain 258 g polyisoprene; the convention rate is 86%. Take the average value of 7 test results. The content of polyisoprene in cis-1, 4-structure in the polyisoprene is 98.3%, the molecular weight distribution is bimodal distribution, the peak molecular weight of the high molecular weight component fraction is $1.1 \times 10^6$, the peak molecular weight of the low molecular weight component fraction is $2.4 \times 10^5$, the weight ratio of the high molecular weight component fraction to the low molecular weight component fraction is 19.7:1, and the Mooney viscosity is 74. In addition, all the errors of the 7 test results are smaller than 5%.

TABLE 4

| Sampling Position | Peak Pattern | Molecular Weight of High Molecular Weight component fraction | Molecular Weight of low Molecular Weight component fraction | Weight Ratio of Content of Component at High Molecular Weight component fraction to Component at Low Molecular Weight component fraction |
|---|---|---|---|---|
| Top side | Unimodal | $1.14 \times 10^6$ | — | — |
| Bottom side | Bimodal | $1.06 \times 10^6$ | $2.43 \times 10^5$ | 30.2 |
| Left side | Unimodal | $2.42 \times 10^5$ | — | — |
| Right side | Bimodal | $1.16 \times 10^6$ | $2.42 \times 10^5$ | 28.4 |
| Front side | Bimodal | $1.13 \times 10^6$ | $2.47 \times 10^5$ | 35.2 |
| Rear side | Unimodal | $1.10 \times 10^6$ | — | — |
| Center | Bimodal | $1.10 \times 10^6$ | $2.43 \times 10^5$ | 31.7 |
| Difference/error | Unimodal or bimodal | $9.18 \times 10^5$ | $0.5 \times 10^4$ | 22% |

Example 4

This example is provided to describe the polyisoprene and preparation method thereof provided by the present invention.

Under nitrogen protection, at 40° C., mix 300 g isoprene, 200 ml rare earth catalyst C22 obtained in the preparation example 6, and 1800 g hexane to homogeneous state in a polymerization autoclave, and agitate for 1 h; then, add 6 ml mixed liquid of rare earth catalyst C12 obtained in the preparation example 2 and 500 g hexane, and keep on agitation and maintain the reaction for 1 h, to obtain a solution containing polymer. Discharge the solution containing polymer from the autoclave, add 100 ml 3 wt. % ethanol solution of 2,6-diteriarybutyl hydroquinone to terminate the reaction, remove the organic solvent and dry the polymer, to obtain 232 g polyisoprene; the convention rate is 77%. Carry out test and take the average value of 7 test results. The content of polyisoprene in cis-1,4-structure in the polyisoprene is 98.1%, the molecular weight distribution is bimodal distribution, the peak molecular weight of the high molecular weight component fraction is $1.8 \times 10^6$, the peak molecular weight of the low molecular weight component fraction is $3.4 \times 10^5$, the weight ratio of the high molecular weight component fraction to the low molecular weight component fraction is 5.2:1, and the Mooney viscosity is 61. In addition, all the errors of the 7 test results are smaller than 5%.

Example 5

This example is provided to describe the polyisoprene and preparation method thereof provided by the present invention.

In this example, four 5 L polymerization autoclaves connected in series are used as the polymerization autoclaves. The temperature of the first autoclave is controlled at 20° C., the temperature of the second autoclave is controlled at 35° C., the temperature of the third autoclave is controlled at 35° C., and the temperature of the fourth autoclave is controlled at 60° C. Add isoprene, rare earth catalyst C24 prepared in the preparation example 8, and hexane with a metering pump into the first polymerization autoclave continuously, at 1.1 L/h, 0.22 L/h, and 6.0 L/h flow rates respectively. Add rare earth catalyst C13 prepared in the preparation example 3 with a metering pump into the fourth autoclave continuously, at 0.12 L/h flow rate. After the reaction becomes stabilized, take out 3 kg glue solution from the top of the fourth autoclave, add 150 ml 3 wt. % ethanol solution of 2,6-diteriarybutyl hydroquinone to terminate the reaction, remove the organic solvent and dry, to obtain 377 g polyisoprene; the convention rate is 82%. As measured in test, the content of polyisoprene in cis-1,4-structure in the polyisoprene is 98.0%, the molecular weight distribution is bimodal distribution, the peak molecular weight of the high molecular weight component fraction is $1.7 \times 10^6$, the peak molecular weight of the low molecular weight component fraction is $2.8 \times 10^5$, the weight ratio of the high molecular weight component fraction to the low molecular weight component fraction is 24.1:1, and the Mooney viscosity is 84. In addition, all the errors of the 7 test results are smaller than 5%.

Example 6

This example is provided to describe the polyisoprene and preparation method thereof provided by the present invention.

In this example, four 5 L polymerization autoclaves connected in series are used. The temperature of the first autoclave is controlled at 30° C., the temperature of the second autoclave is controlled at 30° C., the temperature of the third autoclave is controlled at 30° C., and the temperature of the fourth autoclave is controlled at 50° C. Add isoprene, rare earth catalyst C23 prepared in the preparation example 7, and hexane with a metering pump into the first polymerization autoclave continuously, at 1.0 L/h, 0.45 L/h, and 6.0 L/h flow rates respectively. Add rare earth catalyst C14 prepared in the preparation example 4 with a metering pump into the third autoclave continuously, at 0.14 L/h flow rate. After the reaction becomes stabilized, take out 3 kg glue solution from the top of the fourth autoclave, add 150 ml 3 wt. % ethanol solution of 2,6-diteriarybutyl hydroquinone to terminate the reaction, remove the organic solvent and dry, to obtain 362 g polyisoprene; the convention rate is 88%. As measured in test, the content of polyisoprene in cis-1,4-structure in the polyisoprene is 98.3%, the molecular weight distribution is bimodal distribution, the peak molecular weight of the high molecular weight component fraction is $1.4 \times 10^6$, the peak molecular weight of the low molecular weight component fraction is $3.2 \times 10^5$, the weight ratio of the high molecular weight component fraction to the low molecular weight component fraction is 14.4:1, and the Mooney viscosity is 72. In addition, all the errors of the 7 test results are smaller than 5%.

Example 7

This example is provided to describe the polyisoprene and preparation method thereof provided by the present invention.

Under nitrogen protection, at 20° C., mix 300 g isoprene, 100 ml rare earth catalyst C21 obtained in the preparation example 5, 40 ml rare earth catalyst C12 prepared in the preparation example 2, and 2000 g hexane to homogeneous state in a polymerization autoclave, and agitate and maintain the reaction for 0.5 h, to obtain a solution containing polymer. Discharge the solution containing polymer from the autoclave, add 80 ml 3 wt. % ethanol solution of 2,6-diteriarybutyl hydroquinone to terminate the reaction, remove the organic solvent and dry the polymer, to obtain 78 g polyisoprene; the convention rate is 26%. As measured in test, the content of polyisoprene in cis-1,4-structure in the polyisoprene is 98.6%, the molecular weight distribution is bimodal distribution, the peak molecular weight of the high molecular weight component fraction is $1.2 \times 10^6$, the peak molecular weight of the low molecular weight component fraction is $3.8 \times 10^5$, the weight ratio of the high molecular weight component fraction to the low molecular weight component fraction is 1.2:1, and the Mooney viscosity is 56. In addition, all the errors of the 7 test results are smaller than 5%.

Example 8

This example is provided to describe the polyisoprene and preparation method thereof provided by the present invention.

Under nitrogen protection, at −30° C., mix 300 g isoprene, 150 ml rare earth catalyst C21 obtained in the preparation example 5, and 1800 g hexane to homogeneous state in a heat-insulated polymerization autoclave, and agitate for 20 min; then, add 80 ml rare earth catalyst C11 obtained in the preparation example 4, and keep on agitation and maintain the reaction for 6.5 h, to obtain a solution containing polymer. Discharge the solution containing polymer from the autoclave, add 100 ml 3 wt. % ethanol solution of 2,6-diteriarybutyl hydroquinone to terminate the reaction, remove the organic solvent and dry the polymer, to obtain 241 g polyisoprene; the convention rate is 80%. As measured in test, the content of polyisoprene in cis-1,4-structure in the polyisoprene is 98.6%, the molecular weight distribution is bimodal distribution, the peak molecular weight of the high molecular weight component fraction is $1.0\times10^6$, the peak molecular weight of the low molecular weight component fraction is $3.8\times10^5$, the weight ratio of the high molecular weight component fraction to the low molecular weight component fraction is 3.5:1, and the Mooney viscosity is 64. In addition, all the errors of the 7 test results are smaller than 5%.

Comparative Example 3

This comparative example is provided to describe polyisoprene and preparation method thereof for comparison.

Under nitrogen protection, at 20° C., mix 300 g isoprene, 140 ml rare earth catalyst C21 obtained in the preparation example 5, and 2000 g hexane to homogeneous state in a polymerization autoclave, and agitate and maintain the reaction for 2.5 h, to obtain a solution containing polymer. Discharge the solution containing polymer from the autoclave, add 80 ml 3 wt. % ethanol solution of 2,6-diteriarybutyl hydroquinone to terminate the reaction, remove the organic solvent and dry the polymer, to obtain 240 g polyisoprene; the convention rate is 80%. As measured in test, the content of polyisoprene in cis-1,4-structure in the polyisoprene is 98.3%; the molecular weight distribution is unimodal distribution, the peak molecular weight is $1.6\times10^6$, the number-average molecular weight is $4.8\times10^5$, the molecular weight distribution factor is 2.62, and the Mooney viscosity is 92.

Comparative Example 4

This comparative example is provided to describe polyisoprene and preparation method thereof for comparison.

Under nitrogen protection, at 20° C., mix 300 g isoprene, 140 ml rare earth catalyst C12 obtained in the preparation example 2, and 2000 g hexane to homogeneous state in a polymerization autoclave, and agitate and maintain the reaction for 1 h, to obtain a solution containing polymer. Discharge the solution containing polymer from the autoclave, add 80 ml 3 wt. % ethanol solution of 2,6-diteriarybutyl hydroquinone to terminate the reaction, remove the organic solvent and dry the polymer, to obtain 77 g polyisoprene; the convention rate is 26%. As measured in test, the content of polyisoprene in cis-1,4-structure in the polyisoprene is 96.8%; the molecular weight distribution is unimodal distribution, the peak molecular weight is $6.9\times10^5$, the number-average molecular weight is $2.2\times10^5$, the molecular weight distribution factor is 2.81, and the Mooney viscosity is 37.

Test Example

This test example is provided to describe the performance of polyisoprene rubber with bimodal distribution in the present invention.

Carry out mixing for the polyisoprene prepared in Example 1, Example 2, Comparative Example 1, Comparative Example 2, Comparative Example 3, and Comparative Example 4 with the formula and mixing method described in ASTM D3403. The formulation used for mixing is: based on the weight of the polyisoprene rubber is 100 parts by weight (pbw), add 5 pbw zinc oxide, 2 pbw stearic acid, 2.25 pbw sulfur, 35 pbw industrial reference carbon black, and 0.70 pbw accelerator N-teriarybutyl-2-benzothiazole sulfenamide (TBBS). The internal mixer is 1.57 L Banbury mini-type internal mixer for lab use. After mixing, vulcanize the compound at 145° C. for 35 min, to obtain a vulcanizate. Test the tensile properties of the vulcanizate with the method described in GB/T 528. The results are shown in Table 5.

TABLE 5

| Polyisoprene | Maximum Current of Internal Mixer/A | Tensile Strength/MPa |
| --- | --- | --- |
| Example 1 | 20 | 27.6 |
| Example 2 | 19 | 27.2 |
| Comparative Example 1 | 21 | 23.5 |
| Comparative Example 2 | 26 | 26.6 |
| Comparative Example 3 | 26 | 26.8 |
| Comparative Example 4 | 15 | 23.2 |

It can be seen from above result: the molecular weight of the polyisoprene obtained with the method provided by the present invention is in bimodal distribution. When mixing is carried out for the polyisoprene prepared with the method provided by the present invention with an internal mixer (Example 1 and Example 2), the maximum current of the internal mixer is obviously lower than the maximum current of the internal mixer when the internal mixer is used for mixing the polyisoprene with high molecular weight and narrow unimodal distribution (Comparative Example 3) and also obviously lower than the polyisoprene obtained with a blending method (Comparative Example 2). That indicates the polyisoprene prepared with the method provided by the present invention has higher processability. Moreover, compared to the polyisoprene with low molecular weight and narrow unimodal distribution (Comparative Example 4) and the polyisoprene obtained with a mixing method (Comparative Example 1), the polyisoprene prepared with the method provided by the present invention has obviously higher tensile strength. That indicates the polyisoprene provided by the present invention has higher mechanical properties.

While some preferred examples of the present invention are described above, the present invention is not limited to the details in those examples. Those skilled in the art can make modifications and variations to the technical scheme of the present invention, without departing from the spirit of the present invention. However, all these modifications and variations shall be deemed as falling into the protected domain of the present invention.

In addition, it should be noted: the specific technical features described in above examples can be combined in any appropriate form, provided that there is no conflict. To avoid unnecessary repetition, the possible combinations are not described specifically in the present invention.

Moreover, the different examples of the present invention can be combined freely as required, as long as the combinations don't deviate from the ideal and spirit of the present invention. However, such combinations shall also be deemed as falling into the scope disclosed in the present invention.

The invention claimed is:

1. A polyisoprene, which possesses bimodal molecular weight distribution as measured in GPC test, the peak molecular weight of high molecular weight component fraction is $1\times10^6$-$2\times10^6$, the peak molecular weight of low molecular weight component fraction is $2\times10^5$-$4\times10^5$, and the weight ratio of the high molecular weight component fraction to the low molecular weight component fraction is 1-25:1.

2. The polyisoprene according to claim 1, wherein the weight ratio of the high molecular weight component fraction to the low molecular weight component fraction is 5-20:1.

3. The polyisoprene according to claim 1, wherein the content of polyisoprene in cis-1,4-structure in the polyisoprene is higher than 98%.

4. The polyisoprene according to claim 2, wherein the content of polyisoprene in cis-1,4-structure in the polyisoprene is higher than 98%.

5. A preparation method of polyisoprene comprising conducting polymerization reaction of isoprene in a first organic solvent under the presence of rare earth catalyst I and rare earth catalyst II, to obtain polyisoprene with bimodal molecular weight distribution, wherein the polymerization reaction conditions are controlled to ensure the peak molecular weight of the high molecular weight component fraction in the polyisoprene is $1\times10^6$-$2\times10^6$ and the peak molecular weight of the low molecular weight component fraction is $2\times10^5$-$4\times10^5$, and the weight ratio of the high molecular weight component fraction to the low molecular weight component fraction is 1-25:1; the rare earth catalyst I is obtained by contacting materials A, B and D with each other in a second organic solvent and treating them through a first aging process, and then adding material C and treating through a second aging process; the rare earth catalyst II is obtained by contacting materials A, C and D with each other in a third organic solvent and treating them through a third aging process, and then adding material B and treating through a fourth aging process; wherein, material A is neodymium carboxylate, material B is an aluminum alkyl compound, material C is a halogen-containing compound, and material D is conjugated diene; the first aging process, second aging process, third aging process, and fourth aging process are carried out under the same conditions or different conditions.

6. The preparation method according to claim 5, wherein the neodymium carboxylate is $C_1$-$C_{20}$ neodymium carboxylate.

7. The preparation method according to claim 5, wherein the aluminum alkyl compound is selected from compounds represented by general formula $AlR_3$ and/or $AlHR_2$, wherein R is $C_1$-$C_6$ alkyl.

8. The preparation method according to claim 5, wherein, the halogen-containing compound is selected from aluminum alkyl halides represented by general formula $AlR_2X$, sesquialuminum alkyls represented by general formula $Al_2R_3X_3$, halogenated hydrocarbons represented by general formula RX, and halogenated silanes represented by general formula $R'_nX_{4-n}Si$, wherein R is ethyl, propyl, isopropyl, butyl, isobutyl, tertiary butyl, benzyl or allyl, X is bromine or chlorine, R' is methyl, ethyl, propyl, or isopropyl, and n is an integer within 0-3 range.

9. The preparation method according to claim 5, wherein the conjugated diene is $C_4$-$C_6$ conjugated dien.

10. The preparation method according to claim 5, wherein when the rare earth catalyst I is prepared, the mol ratio of the components is A:B:C:D=1:15-30:2-4:10-30; when the rare earth catalyst II is prepared, the mol ratio of the components is A:B:C:D=1:8-20:2-4:40-70.

11. The preparation method according to claim 5, wherein the first aging process, second aging process, third aging process, and fourth aging process are carried out in inert atmosphere; the conditions of the first aging process include: temperature: 30-60° C., time: 10-60 min; the conditions of the second aging process include: temperature: 10-30° C., time: 1-48h; the conditions of the third aging process include: temperature: 0-30° C., time: 5-40 min, the conditions of the fourth aging process include: temperature: 0-30° C., time: 10-48h; preferably, the conditions of the first aging process include: temperature: 40-50° C., time: 15-30 min; the conditions of the second aging process include: temperature: 15-25° C., time: 16-24h; the conditions of the third aging process include: temperature: 5-15° C., time: 10-20 min; the conditions of the fourth aging process include: temperature: 10-20° C., time: 18-24h.

12. The preparation method according to claim 5, wherein when calculated by component A, the mol ratio of the rare earth catalyst I to the rare earth catalyst II is 1:1-50.

13. The preparation method according to claim 5, wherein the rare earth catalyst I and rare earth catalyst II are added in such a manner that the rare earth catalyst II is added first, and 20-120 min later, the rare earth catalyst I is added.

14. The preparation method according to claim 5, wherein the polymerization reaction is carried out in inert atmosphere; the conditions of the polymerization reaction include: temperature: −60° C.-80° C., time: 0.5-7h.

15. A rubber compound or poly isoprene vulcanizate comprising the polyisoprene according to claim 1.

16. The preparation method according to claim 6, wherein the neodymium carboxylate is selected from one or more of neodymium naphthenate, neodymium n-octoate, neodymium iso-octoate, neodymium pelargonate, neodymium neodecanoate, and neodymium n-decanoate.

17. The preparation method according to claim 7, wherein the aluminum alkyl compound is selected from one or more of trimethyl aluminum, triethyl aluminum, tripropyl aluminum, tributyl aluminum, triisobutyl aluminum, tripentyl aluminum, trihexyl aluminum, diethyl aluminum hydride, dibutyl aluminum hydride, and diisobutyl aluminum hydride.

18. The preparation method according to claim 8, wherein the halogen-containing compound is selected from one or more of aluminum diethyl monochloride, aluminum diisobutyl monochloride, ethyl aluminum sesqui chloride, and isobutyl aluminum sesqui chloride.

19. The preparation method according to claim 9, wherein the conjugated diene is selected from one or more of butadiene, isoprene, 1,3-pentylene, 1,3-hexadiene, and 2,3-dimethyl butadiene.

20. The preparation method according to claim 9, wherein the conjugated diene is butadiene and/or isoprene.

* * * * *